United States Patent

Satchell, Jr. et al.

Patent Number: 5,275,742
Date of Patent: Jan. 4, 1994

[54] TREATMENT OF WATER

[75] Inventors: Donald P. Satchell, Jr., Summit; Alberto LaCava, South Plainfield, both of N.J.; Craig C. Ibbetson, Surrey, England

[73] Assignee: The BOC Group plc, Windlesham, England

[21] Appl. No.: 989,421

[22] Filed: Dec. 11, 1992

[30] Foreign Application Priority Data

Dec. 13, 1991 [GB] United Kingdom ............ 9126491

[51] Int. Cl.$^5$ .................................. C02F 1/78
[52] U.S. Cl. ............................ 210/760; 210/151; 210/192; 210/195.1; 210/202; 210/604
[58] Field of Search ............... 210/760, 764, 604, 151, 210/195.1, 202, 192, 259

[56] References Cited

U.S. PATENT DOCUMENTS

| | | | |
|---|---|---|---|
| 3,660,277 | 5/1972 | McWhirter et al. | 210/604 |
| 3,732,163 | 5/1973 | Lapidot | 210/760 |
| 3,748,262 | 7/1973 | Lee et al. | 210/760 |
| 3,856,671 | 12/1974 | Lee et al. | 210/760 |
| 4,132,637 | 1/1979 | Key et al. | 210/604 |
| 4,178,239 | 12/1979 | Lowther | 210/604 |
| 4,252,654 | 2/1981 | Leitzke et al. | 210/760 |
| 4,255,257 | 3/1981 | Greiner et al. | 210/760 |
| 4,256,574 | 3/1981 | Bhargava | 210/760 |
| 4,352,740 | 10/1982 | Grader et al. | 210/764 |

*Primary Examiner*—Stanley S. Silverman
*Assistant Examiner*—Cynthia L. Nessler
*Attorney, Agent, or Firm*—Coleman R. Reap; Larry R. Cassett

[57] ABSTRACT

Oxygen is separated from air by pressure swing adsorption in plant 2. The oxygen is passed through an ozone generator 4. The resulting ozonated oxygen is passed upwardly through a contactor 6 countercurrently to the flow of a side stream of water to be treated with ozone. The side stream containing dissolved ozone flows from the contactor 6 to a mixer 8 in which it is mixed with a main stream of water. The effluent gas from the contactor 6 contains air displaced from the water and undissolved oxygen. It is divided into two parts. One part flows to the pressure swing adsorption plant 2 and is separated therein with the air. The other part is dried by temperature swing adsorption in drier 20 and the resulting dried gas is ozonated in the ozone generator 4 with the oxygen from the plant 2.

20 Claims, 1 Drawing Sheet

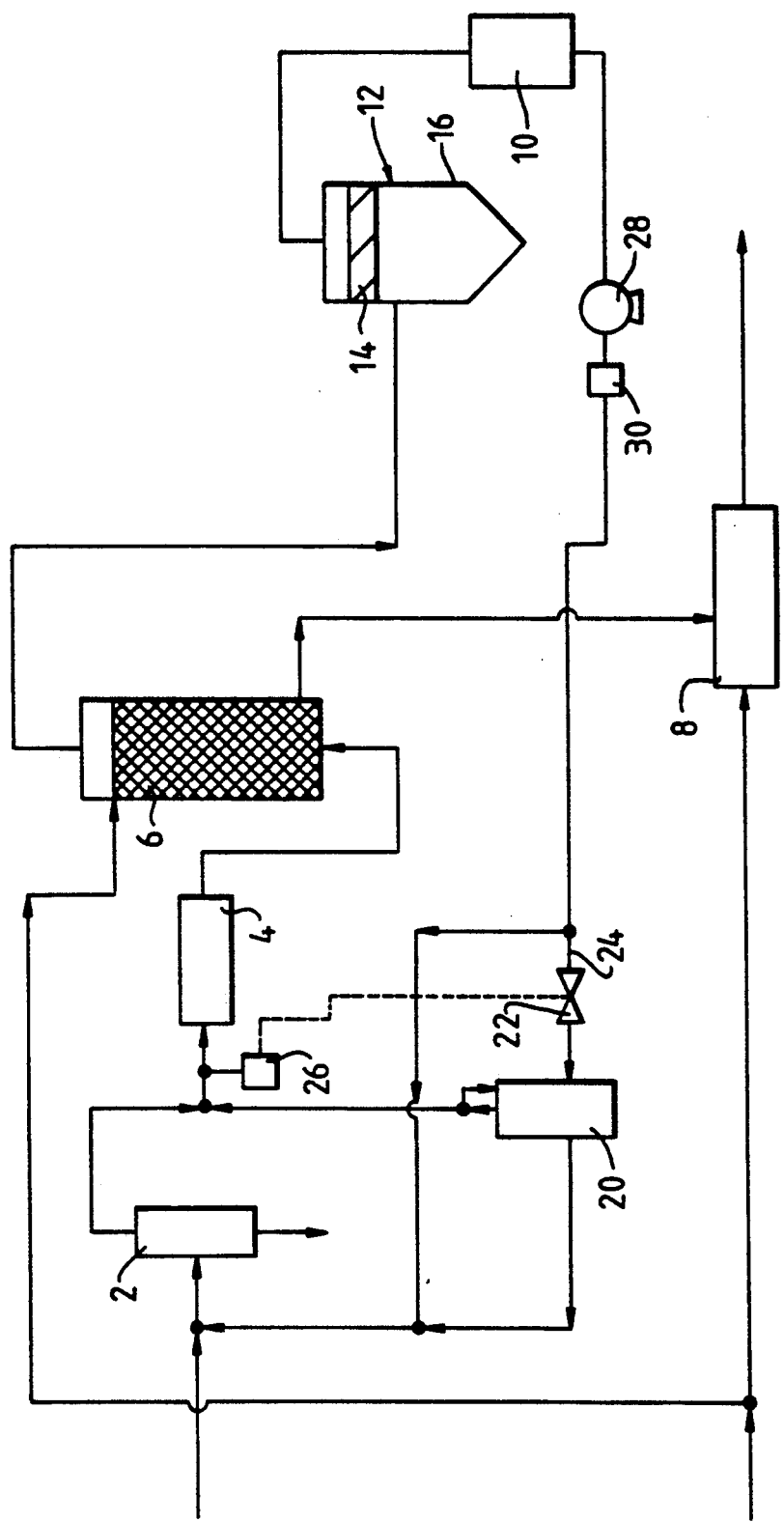

TREATMENT OF WATER

TECHNICAL FIELD

The present invention relates to a method and apparatus for treating a volume of water with ozone.

BACKGROUND OF THE PRIOR ART

The term "water" as used herein includes within its scope any source of water which is liable to be impure or to contain bacteria or other organisms that are susceptible to being treated with ozone. The water may for example include solids. Indeed, it may be sewage, or sewage sludge or other aqueous effluent.

Ozone is an oxidizing agent which finds use in the treatment of water, for example to produce a potable product. Since ozone is relatively unstable compared with other widely used industrial gases, such as oxygen and nitrogen, it is produced in commercial practice at the site of its use. The production method is the creation of an electrical discharge in a volume of gas comprising molecules of oxygen. The electrical discharge creates excited and unstable species of oxygen that react with unexcited oxygen molecules to form ozone. Typically, the source of gas comprising molecules of oxygen is air. There are, however, advantages in using, instead, a source of oxygen that has been separated from air, that is to say either pure oxygen or oxygen-enriched air. Firstly, the yield of ozone obtained increases with an increasing oxygen partial pressure. Secondly, a smaller ozonator is required for a given rate of production of ozone.

Although oxygen is soluble in water to a significant degree, ozone has a greater solubility. It is therefore typical that the effluent gas from the treatment of water with ozonized oxygen includes an enhanced mole ratio of oxygen to ozone. In order for oxygen to be preferred to air as the feed gas of choice for preparing ozone, it is desirable to put to good use the oxygen that is not converted to ozone. For example, either the residual gas formed after contacting the water with the ozonated oxygen can be passed to another treatment process for use as a treatment gas or it can be recycled to an apparatus or plant which produces the ozone. Since the water that is being treated with the ozone normally contains dissolved air, nitrogen is displaced from solution by the ozonated oxygen and thus the residual gas comprises a mixture of oxygen and nitrogen together with any undissolved ozone and it is desirable that a "recycle" ozonation plant should be designed on a basis that takes account of this dilution with nitrogen of the oxygen that is not converted to ozone.

Various different systems have been proposed for recycling the vent gas from an apparatus in which ozone is contacted with water. A general summary of such systems is provided in Chapter VI entitled "Ozone Generation and its Relationship to the Economical Application of Ozone in Waste Water Treatment" by Harvey M Rosen, edited by Evans and published by Ann Arbor Science, 1972. In a first system, air is compressed and oxygen is separated from the compressed air by pressure swing adsorption. The resulting oxygen gas is passed through an ozonator and the resulting ozonated oxygen is contacted with water to be treated. The undissolved gas from the contactor is then recycled to the compression stage. In an alternative scheme, a stream of oxygen is compressed and dried, and the resulting dried oxygen contacted with the waste water to be treated. Upstream of such contact, the waste water is subjected to vacuum degassing. Accordingly, the undissolved gas from the contactor is relatively free of nitrogen. The undissolved gas is recycled to the compressor. The latter process suffers from the disadvantage that it is necessary to degas the water to be treated. The former process suffers from the disadvantage that in the absence of any degassing of the waste water, the recycle gas from the contactor typically contains in the order of 40% by volume of components other than oxygen, and in particular contains nitrogen, argon, carbon dioxide and water vapor. The resultant size of the apparatus or plant for separating the mixture of air and recycle gas by pressure swing adsorption is therefore considerably greater than it would be were the recycle gas to contain a much lower proportion of nitrogen.

In a paper entitled "Ozone Generation Utilizing a Purity Oxygen Feed Gas", by A Warakomski, Proceedings of the Ninth World Ozone Congress, New York 1989 (Editor: L J Bollky; Publisher: International Ozone Association) there is an assessment of the operation of an apparatus including a first stage for separating oxygen from air by pressure swing adsorption and a second stage for ozonating the resulting oxygen. The assessment includes a discussion of the operation of the apparatus as part of a 'classical recycle system'. The paper identifies the relationship between the energy demand of the ozonator and the ozone concentration in the product gas for a number of different feed gas compositions. It is disclosed that for any particular ozone concentration in the product gas, the ozone generation energy demand decreases with increasing oxygen concentration in the feed gas. In addition, the adverse effect of decreasing feed gas oxygen concentration is said to be relatively small at low ozone concentrations in the product gas. Hence the adverse effect is relatively large at high ozone concentrations. Further, it is disclosed that the feed gas in the 'classical recycle system' contains about 55 to 65% by volume of oxygen. This implies that the 'classical recycle system' involves recycling the effluent gas from the contactor directly to the ozonator inlet without first performing any separation of this gas to increase its oxygen concentration. Accordingly, such recycle processes are unfavorable in terms of the economics of ozone production.

GB-A-1 521 166 discloses a process for the treatment of water, which comprises contacting a partial stream of the water under pressure in a packed column with an oxygen-ozone mixture from an ozonator, mixing the partial stream with the water to be treated and recycling oxygen which is not dissolved in the column to the ozonator. The pressure of the contact column is adjusted so that the ozonator, the content of nitrogen in the recycled oxygen is in an amount which permits substantially optimum operation of the ozonator. For example, the feed gas to the ozonator may include between 2 and 11% by volume of nitrogen. It is disclosed that typically a pressure of 5 bar is needed to provide a percentage of nitrogen in the recycle gas as low as about 15% by volume. The requirement to operate the ozone generator at super atmospheric pressure is however disadvantageous since it greatly increases power consumption and since it creates an inherent risk of ozone leaking into the atmosphere.

The present invention provides a method and apparatus for the treatment of water with ozone which reduces the disadvantages associated with the known processes discussed hereinabove.

According to the present invention there is provided a method of treating with ozone a volume of water, containing dissolved air, comprising separating oxygen from air in a first region and ozonating the resulting oxygen in a second region; countercurrently contacting the ozonated oxygen with part of the water to be treated thereby to form an ozonated stream of water and an effluent gas comprising firstly undissolved oxygen and secondly gas displaced from solution in the water by the ozonated oxygen; mixing the ozonated stream of water with another part of the water to be treated; and recycling a first stream of the effluent gas to the second region and a second stream of the effluent gas to the first region.

The invention also provides apparatus for treating with ozone a volume of water containing dissolved air, comprising means for separating oxygen from air; an ozonator for ozonating the resulting oxygen; a contactor for countercurrently contacting the ozonated oxygen with part of the water to be treated whereby in use to form an ozonated stream of water and an effluent gas comprising firstly undissolved oxygen and secondly gas displaced from solution in the water by the ozonated oxygen; a device for mixing the ozonated stream of water with another part of the water to be treated; and means for recycling a first stream of the effluent gas to the ozonator and a second stream of the effluent gas to the said separation means.

Preferably, oxygen is separated from the air by pressure swing adsorption. The oxygen is preferably not pure. In general, the penalty attached to the production of pure oxygen in terms of yield of oxygen and specific power consumption, that is the power consumption per volume of oxygen produced, more than counteracts any benefit to be gained in the ozonator from the absence of nitrogen or argon impurities. Typically, the product oxygen from commercially available pressure swing adsorption plants has a purity of from 90 to 95% and such a product is suitable for use in the invention. It must be borne in mind, however, that recycling the second stream of effluent gas in effect increases the oxygen concentration of the air that is separated by pressure swing adsorption and thereby makes possible a reduction in the size and capital cost of apparatus or plant required to give oxygen of a given purity.

Preferably, the choice of adsorbent and operating parameters for the separation of the air is such as to enable the air to be dried during the separation of oxygen therefrom.

Countercurrent contact between the ozonated oxygen and water may, for example, be performed in a packed column. Typically, the volume of water to be treated is divided into two streams, the first being contacted with the ozonated oxygen and the second being mixed with the ozonated first stream. In this way, by treating only part of the flow of water with the ozonated oxygen, it becomes possible to minimize both the amount of nitrogen and other gases that are stripped from the water and the amount of oxygen that is dissolved so as to produce a vent gas with a relatively high proportion of oxygen (typically at least 75% by volume).

The contacting device preferably has a plurality of stages so as to maximize the dissolution of the ozone. Typically it has from 3 to 10 theoretical stages, but it can alternatively have fewer such stages, say from 2 to 3. Typically, the vent gas contains less than 0.5% by volume of ozone.

Typically, the rate of flow of water through the contacting device is from 10 to 70% (and preferably 25 to 30%) of the total flow of water to be treated.

Residual ozone in the vent gas is preferably decomposed upstream of division of the vent gas into the first and second streams. Such ozone decomposition may be accomplished by known means. Preferably, liquid water is disentrained from the vent gas upstream of the decomposition of the ozone.

There is no need to operate the countercurrent contactor with a super atmospheric gas head space. Indeed, it is preferred to run the countercurrent contactor with a head space pressure below atmospheric pressure. Such an arrangement minimizes ozone loss to the ambient air. The sub-atmospheric pressure may be maintained by a downstream blower used to recycle effluent gas from the countercurrent contactor.

The first stream of effluent gas is desirably dried upstream of its ozonation. Thorough drying is desirable since even small quantities of water vapor have a markedly adverse effect on the production of ozone. Preferably the first stream of effluent gas is dried by temperature swing adsorption. The effluent gas from the countercurrent contactor may be divided into the first and second effluent gas streams upstream or downstream of the drier.

Preferably the method according to the invention is controlled so as to maintain a substantially constant oxygen composition downstream of where the oxygen is mixed with the first stream of effluent gas and upstream of where ozonation takes place. Preferably, the rate at which the first effluent gas stream is recycled is varied as necessary so as to attain such a constant gas composition.

BRIEF DESCRIPTION OF THE DRAWINGS

The present invention will now be described by way of example with reference to the accompanying drawing which is a schematic flow diagram illustrating a process for ozonating water.

The drawing is not to scale.

DETAILED DESCRIPTION OF THE INVENTION

Referring to the drawing a stream of air is passed to a plant 2 for separating oxygen from air by pressure swing adsorption. The air is mixed with a recycle stream upstream of the plant 2. The formation of the recycle stream is described hereinbelow. The plant 2 for separating oxygen from air by pressure swing adsorption may be of any conventional kind. It typically comprises a pump or compressor, and a plurality of beds of adsorbent that is able to adsorb nitrogen in preference to oxygen. It may also include a vacuum pump. The compressor, adsorbent beds and vacuum pump are not shown in the drawing. Suitable processes for the separation of air by pressure swing adsorption are, for example, described in EP-A-273 723. In operation, an adsorption step is effective to provide an unadsorbed product gas typically containing at least 90% by volume of oxygen. Using, for example, conventional 5A zeolite molecular sieve, carbon dioxide is substantially completely adsorbed and adsorption of nitrogen in preference to oxygen enables an oxygen product of at least 90% purity to be formed. Typically, the adsorption pressure is in the range of 1 to 2 atmospheres absolute.

The beds are each regenerated in sequence by being subjected to a sub-atmospheric pressure created by the vacuum pump. Typically, this pressure is in the range of 200 to 760 torr. The previously adsorbed components are desorbed at such a pressure and thus the adsorbent beds are able to be regenerated. While one bed is being regenerated in this manner, another bed or beds of adsorbent are being used to produce the oxygen product.

The oxygen product from the plant 2 is mixed with recycle gas as is described below and is then passed into an ozone generator ('ozonator') 4 in which ozone is formed by means of a silent electrical discharge. The ozonator preferably receives its feed gas at a pressure in the range of 1 to 3 bars absolute, for example 1.5 bars absolute. The resulting ozonated oxygen, which typically contains from 1 to 10% by volume of ozone then flows to the bottom of a countercurrent contactor 6 in which ascending ozonated oxygen comes into intimate contact with a downward flow of water to be treated. This downward flow of water is created by taking as a sidestream a portion of the total flow of water to be treated and introducing it into the top of the contactor 6. Typically from 10 to 70% of the water is so taken, preferably from 25 to 30%. The contactor 6 is preferably a packed column having from 3 to 10 theoretical stages of packing. Preferably the number of stages is sufficient to dissolve at least 95% by volume of the incoming ozone. Because the source of water to be treated contains dissolved air, contact between the ozonated oxygen and the water causes nitrogen to come out of solution from the water. Accordingly, the gas passing out of the contactor 6, although rich in oxygen, contains an appreciable proportion of nitrogen and typically up to 0.5% by volume of residual ozone. The composition of such vent gas depends on, amongst other things, the relative rates of flow of water and ozonated oxygen through the contactor 6 and the initial concentration of dissolved nitrogen in the water. Since it is desired to keep down the proportion of nitrogen in the vent gas from the contactor 6, it is preferred to achieve the desired final dose of ozone in the water to be treated by keeping down the proportion of this water that is passed through the contactor 6 while employing a relatively high ozone concentration in the water leaving the contactor. Thus, for example, if it is desired to create in a volume of water to be treated a concentration of ozone of X parts per million by volume, one quarter of that volume may be passed through the contactor 6 and ozone dissolved at a sufficient rate to give a concentration of 4X in the water leaving the contactor, whereby when the water leaving the contactor is remixed with the rest of the water, the resulting concentration of ozone is the desired value of X parts per million by volume. Typically, a dosage in the order of 5 mg of ozone per liter of treated water is created.

The ozonated water that leaves the bottom of the contactor 6 is remixed with the flow of unozonated water in a mixer 8 which may simply comprise a union of two pipelines. The resulting treated water may then be passed to suitable holding tanks (not shown). The residence time of the water between the outlet of the contactor 6 and the inlet to the mixer 8 is preferably kept as short as possible, say no more than a few seconds, in view of the short half-life of ozone.

The contactor 6 is preferably operated at atmospheric pressure or a pressure a little therebelow. It will be appreciated that by operating the plant 2 with an inlet gas pressure significantly above atmospheric pressure, a desired pressure not greater than atmospheric pressure is able to be obtained at the top of the contactor 6 notwithstanding the pressure drop through the plant 2, the ozonator 4 and the contactor 6.

The effluent gas passing out of the top of the contactor 6 typically contains from 70 to 85% by volume of oxygen and up to 1% by volume of ozone. The effluent gas is treated to remove any residual ozone therefrom. Typically, as aforesaid, such residual ozone is present in a proportion of less than 0.5% by volume. Treatment processes for destroying ozone are well known in the art and may comprise a step in which the ozone is caused thermally to decompose or a step in which the decomposition is catalytically promoted. The catalyst is chosen with regard to the chemical composition of impurities in the water with the aim of avoiding any poisoning any poisoning of the catalyst by such impurities. Preferably, a separator 12 is provided upstream of the ozone destruction unit 10 so as to disengage droplets of water from the effluent gas. Typically, the separator 12 comprises an array of knit mesh pads 14 disposed in a phase separator 16 such that the effluent gas passes upwardly therethrough and has droplets of water disengaged therefrom. Excess water collecting in the pads will fall under gravity into the bottom of the phase separator 12, and if desired the pads 14 may from time to time be washed by sprays of water (not shown).

The effluent gas from the contactor 6 is, downstream of its passage through the ozone decomposition unit 10, divided into first and second effluent gas streams. The first effluent gas stream is passed through a drier 20 effective to reduce its dew point to −60° C. or lower.

The drier 20 is preferably of the temperature swing adsorption (TSA) kind. Such driers are well known for drying air and other gases. In such a drier, a gas stream to be dried is preferably passed through one or more beds (not shown) of adsorbent such as alumina or a zeolite effective to adsorb water vapor therefrom. When the bed or beds are fully loaded with adsorbed water vapor, the flow of gas to be dried is switched to another bed or beds of the adsorbent which have been freshly regenerated. The bed or beds previously used to dry the gas are themselves subjected to regeneration. Regeneration is effected at a higher temperature than adsorption of the water vapor: hence the term "temperature swing". The regeneration step is preferably carried out by means of a hot stream of gas, for example at a temperature of 100° to 200° C., that passes through the adsorbent countercurrently to the direction of flow of the gas to be dried.

If desired, the drier 20 may include an upstream refrigerative stage (not shown) whereby a proportion of the water vapor in the first effluent gas stream is condensed out of the stream upstream of a temperature swing adsorption stage.

The dried first effluent gas stream flows from the drier 20 and is mixed with the oxygen from the plant 2 to form the gas stream that is introduced into the ozonator 4.

The second effluent gas stream is mixed with the incoming air for separation. There is no need to dry the second effluent gas stream upstream of the plant 2. As described above, the plant 2 is able to dry the incoming gas and produce a dry oxygen product. The relative flow rates of the first and second effluent gas streams are determined by a valve 22 positioned, for example, in a conduit 24 through which the second effluent gas stream flows. The valve 22 is operatively associated with an oxygen analyzer 26 that continuously monitors the oxygen concentration in the gas entering the ozonizer 4. The arrangement is such that the rate of flow of the first effluent gas stream is that necessary to give a chosen oxygen concentration in the gas mixture entering the ozonizer 4. The less the resistance offered by the valve 22 to the flow of the second vent gas stream, the greater is this flow and hence the less is the flow of the first effluent gas stream. Since the first effluent gas stream typically has a lower proportion of oxygen than the product gas from the plant 2, increasing the flow rate of the first effluent gas stream has the effect of decreasing the oxygen concentration of the gas mixture entering the ozonator 4. Therefore there is a position of the valve 22 which enables a gas mixture having a chosen oxygen concentration to enter the ozonator 4. The chosen proportion of oxygen in this gas mixture is typically in the range of 85 to 90% by volume, for example 88% by volume.

If desired, the incoming air stream, as well as being mixed with a second effluent gas stream, may also be mixed with a gas stream vented from the temperature swing adsorption drier 20. This gas stream comprises water vapor, oxygen and nitrogen. Typically, a fraction, for example, 20% of the dried gas stream from a producing bed is used as a purge gas to regenerate the adsorbent of the temperature swing adsorption drier 20 and thereby creates the gas stream vented from the drier 20 that is mixed with the second effluent gas stream and the incoming air upstream of the plant 2. Each adsorbent bed of the plant 2 is typically provided with a layer of desiccant to enable the water vapor to be adsorbed upstream of molecular sieve adsorbent sieve adsorbent that is used to effect a separation as between oxygen on the one hand and nitrogen and argon on the other.

In order to maintain an adequate flow of the effluent gas from the contactor 6, this gas may be recompressed in a blower or compressor 28 positioned intermediate the gas outlet from the contactor 6 and the region where the effluent gas is divided into the first and second streams. Preferably, the compressor 28 is located downstream of the ozone destruction unit 10. The blower or compressor 28 is preferably of the liquid ring kind: such a blower or compressor is able to handle gas streams that are both wet and rich in oxygen. If desired, a 'knock-out' drum 30 (or a demister) may be located immediately downstream of the blower or compressor 28 in order to disentrain any water droplets from the gas upstream of the drier 20. The blower may pressurize the effluent gas to a pressure in the range of 1.02 to 10 bar absolute (typically about 1.5 bar absolute) and has an outlet temperature in the order of 10° to 30° C.

The above-described example of the method according to the invention makes possible the operation of an ozonator that is relatively small in size and has a lower specific power than an ozonator giving the same rate of ozone production with air, unenriched in oxygen, as the feed gas. Moreover, the size of the plant 2 for separation of air by pressure swing adsorption is able to be kept down firstly because a first oxygen-rich vent gas stream is recycled to the ozonator 4 thereby reducing the rate at which the plant needs to produce oxygen, and secondly, because the recycle of the second effluent gas stream to the separation plant 2 in comparison with a conventional oxygen PSA plant in which there is no recycle of oxygen, reduces the size and specific power of this plant needed to produce oxygen product of a given purity at a given flow rate, the ability to reuse relatively oxygen-rich effluent gas arises from the fact that only part of the total flow of water to be treated is introduced into the countercurrent contactor 6, thereby keeping down the rate of displacement of nitrogen into the vent gas relative to the rate of entry of oxygen into this gas. The division of the effluent gas into two streams avoids creating an adverse build-up of argon which would occur if all the effluent gas were recycled to the ozonator, and also achieves a better utilization of oxygen than is possible were all the effluent gas to be recycled to the PSA separator.

The method accordingly to the invention is further illustrated by the following example which is based on a computer simulation.

EXAMPLE 2543 kg/hr of air (on a dry basis) is mixed with 405 kg/hr of second effluent gas stream having a composition of 78.2% by volume of oxygen; 15.5% by volume of nitrogen; 3.9% by volume of argon and 2.3% by volume of water vapor and with a stream of gas laden with water vapor that is vented at a rate of 102 kg/hr from the TSA drier 20, which vent stream has an average composition of 71.6% by volume of oxygen; 14.2% by volume of nitrogen; 3.5% by volume of argon, and 10.6% by volume of water vapor.

The resulting mixture is then passed into the PSA plant 2 which operates a PSA cycle having a maximum adsorption pressure of 1.75 bar absolute and a minimum desorption pressure of 0.26 bar absolute. The PSA plant 2 produces 478 kg/hr of a gas mixture, rich in oxygen, containing 93.1% by volume of oxygen, 2.5% by volume of nitrogen and 4.3% by volume of argon. This stream is then mixed with 384 kg/hr of a stream of dried first effluent gas stream flowing from the TSA drier 20. The stream exiting the TSA drier 20 contains 80.1% by volume of oxygen, 15.9% by volume of nitrogen and 4% by volume of argon. The resulting mixing stream is then passed into an ozone generator (ozonator) 4.

An ozonated gas stream comprising 3.4% by volume of ozone, 83.7% by volume of oxygen, 8.7% by volume of nitrogen and 4.2% by volume of argon, flows at a rate of 862 kg/hr into the countercurrent contactor 6 through which flows a side stream of water taken from a main stream at a rate of 2,517,364 kg/hr of water. The stream of water has dissolved oxygen, nitrogen and argon from atmospheric air and is typically at equilibrium conditions. The contactor 6 for this example has 10 theoretical stages and achieves an ozone recovery of about 96%.

A resulting stream of water containing 16 mg/l of dissolved ozone flows into the mixer 8 and is remixed with the main stream of water to give a final ozone dosage of 5 mg/l to a total stream of water of 200 megaliters per day.

Effluent gas comprising 78.2% by volume of oxygen, 0.13% by volume of ozone; 15.4% by volume of nitrogen; 3.9% by volume of argon, and 2.3% by volume of water vapor flows at a rate of 796 kg/hr out of the top of the contact 6. The effluent gas is then treated in phase separator 12 to remove any drops of liquid water and in the ozone destruction unit 10 to decompose catalytically residual ozone.

The effluent gas is then divided into first and a second effluent gas streams. The second effluent gas stream is mixed with the incoming air as described above. The first effluent gas stream is mixed with the incoming air as described above. The first effluent gas stream is passed to the TSA drier at a rate of 486 kg/hr. It is then dried and the resulting dried gas stream is mixed, as described above, with the oxygen-rich gas from the PSA plant 2, while the vent gas laden in water vapor is mixed, as described above, with the incoming air for separation.

In order to create the necessary flow of the effluent gas the blower 28 is operated with an outlet pressure of 1.75 bar absolute.

Although the invention has been described with reference to specific example, it would be appreciated by those skilled in the art that the invention may be embodied in many other forms.

We claim:

1. A method of treating with ozone a volume of water containing dissolved air, comprising separating oxygen from air in a first region and ozonating the resulting oxygen in a second region; countercurrently contacting the ozonated oxygen with part of the water to be treated to form an ozonated stream of water and a effluent gas, the effluent gas comprising undissolved oxygen and gas displaced from solution in the water by the ozonated oxygen; mixing the ozonated stream of water with another part of the water to be treated; dividing the effluent gas into first and second streams, recycling the first stream of said effluent gas to the second region, and recycling the second stream of said effluent gas to the first region.

2. A method as claimed in claim 1, in which oxygen is separated from the air by pressure swing adsorption.

3. A method as claimed in claim 1, in which the resulting oxygen is from 90 to 95% pure.

4. A method as claimed in claim 1, in which contact between the ozonated oxygen and water is performed in a packed column through which the water flows downwards.

5. A method as claimed in claim 1, in which the effluent gas contains at least 75% by volume of oxygen.

6. A method as claimed in claim 1, in which the countercurrent contact between water and the ozonated oxygen takes place in a device having a head space pressure no greater than atmospheric pressure.

7. A method as claimed in claim 1, in which from 10 to 70% total flow of water to be treated is countercurrently contacted with the ozonated oxygen.

8. A method as claimed in claim 7, in which from 25 to 30% of the total flow of water is contacted countercurrently with the ozonated oxygen.

9. A method as claimed in claim 1, in which the effluent gas contains less than 1% by volume of ozone.

10. A method as claimed in claim 9, in which the ozone content of the effluent gas is decomposed upstream of the division of the effluent gas into the first effluent gas stream and the second effluent gas stream.

11. A method as claimed in claim 1, in which the first stream of effluent gas is dried upstream of its ozonation.

12. A method as claimed in claim 11, in which the dew point of the dried first stream of effluent gas is $-60°$ C. or lower.

13. A method as claimed in claim 11, in which the first stream vent gas is mixed with the said resulting oxygen and the rate of formation of the first stream of effluent gas is controlled so as to provide a gas mixture having a substantially constant concentration of oxygen.

14. A method as claimed in claim 11, in which the first stream of effluent gas is dried by temperature swing adsorption.

15. A method as claimed in claim 12, in which a purge gas comprising water vapor, oxygen and nitrogen from the drier is recycled in the first region.

16. Apparatus for treating with ozone a volume of water containing dissolved air, comprising a separation means for separating oxygen from air; an ozonator in fluid communication with said separation means for ozonating the resulting oxygen; a means for dividing the water to be treated into a sidestream and a mainstream; a contactor means in fluid communication with said separation means and said water dividing means for countercurrently contacting the ozonated oxygen with said sidestream to form an ozonated stream of water and an effluent gas, the effluent gas comprising undissolved oxygen and gas displaced from solution in the water by the ozonated oxygen; a means in fluid communication with said contactor means and said water dividing means for mixing the ozonated stream of water with said mainstream; a means in fluid communication with said contactor means for dividing the effluent gas into first and second streams; and a means connected to said gas dividing means for recycling the first stream of the effluent gas to said ozonator and the second stream of the effluent gas to said separation means.

17. Apparatus as claimed in claim 16, in which said separation means is a pressure swing adsorption means.

18. Apparatus as claimed in claim 17, additionally including a valve for controlling the rate of recycle of the first effluent gas stream to the ozonator, said valve being operable so as to maintain a constant oxygen concentration in the gas flowing into the ozonator.

19. Apparatus as claimed in claim 16, in which the countercurrent contactor means comprises a packed column.

20. Apparatus as claimed in claim 19, in which the packed column has from 2 to 10 theoretical stages.

* * * * *